United States Patent
Racape et al.

(10) Patent No.: US 11,758,197 B2
(45) Date of Patent: Sep. 12, 2023

(54) IN-LOOP FILTER WITH MULTIPLE REGIONS

(71) Applicant: INTERDIGITAL VC HOLDINGS, INC., Wilmington, DE (US)

(72) Inventors: Fabien Racape, San Francisco, CA (US); Philippe Bordes, Laille (FR); Edouard Francois, Bourg des Comptes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/258,821

(22) PCT Filed: Jul. 10, 2019

(86) PCT No.: PCT/US2019/041142
§ 371 (c)(1),
(2) Date: Jan. 8, 2021

(87) PCT Pub. No.: WO2020/014316
PCT Pub. Date: Jan. 16, 2020

(65) Prior Publication Data
US 2021/0297706 A1 Sep. 23, 2021

(30) Foreign Application Priority Data

Jul. 11, 2018 (EP) ..................................... 18305939
Aug. 14, 2018 (EP) ..................................... 18306117

(51) Int. Cl.
*H04N 19/82* (2014.01)
*H04N 19/117* (2014.01)
(Continued)

(52) U.S. Cl.
CPC ........... *H04N 19/82* (2014.11); *H04N 19/117* (2014.11); *H04N 19/167* (2014.11);
(Continued)

(58) Field of Classification Search
CPC .. H04N 19/117; H04N 19/463; H04N 19/196; H04N 19/70; H04N 19/176;
(Continued)

(56) References Cited

U.S. PATENT DOCUMENTS

2016/0381383 A1* 12/2016 Oh ......................... H04N 19/52
  375/240.16
2017/0238020 A1*  8/2017 Karczewicz ........... H04N 19/82
  375/240.29

(Continued)

FOREIGN PATENT DOCUMENTS

EP          3349459         7/2018
WO    WO 2011127961 A1   10/2011

OTHER PUBLICATIONS

Gadde et al., CE2: Tests on SAO Design from JVET-J0021 (CE2.3.2), Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0324r1.

(Continued)

*Primary Examiner* — Neil R Mikeska
(74) *Attorney, Agent, or Firm* — Ronald Kolczynski

(57) ABSTRACT

Methods and apparatus for performing in-loop filtering in an encoder or a decoder provide regions which use a common set of filter parameters An index can be sent from an encoder to a decoder indicating which set of filter parameters is to be used for a particular region. The in-loop filter can be Sample Adaptive Offset, Adaptive Loop Filter, or any other such filter. An encoder classifies regions of a picture according to blocks using a common set of filter parameter. The classification can be in the form of a map. Filtering blocks use the common set of filter parameters for a region. A decoder parses a bitstream for a set of filter parameters and an index indicative of the filter parameter set for a region being decoded.

19 Claims, 20 Drawing Sheets

(51) Int. Cl.
  *H04N 19/167* (2014.01)
  *H04N 19/176* (2014.01)
  *H04N 19/196* (2014.01)
  *H04N 19/70* (2014.01)

(52) U.S. Cl.
  CPC ......... *H04N 19/176* (2014.11); *H04N 19/196* (2014.11); *H04N 19/70* (2014.11)

(58) Field of Classification Search
  CPC ...... H04N 19/17; H04N 19/82; H04N 19/167; H04N 19/503
  See application file for complete search history.

(56) References Cited

U.S. PATENT DOCUMENTS

| | | | |
|---|---|---|---|
| 2017/0264900 | A1 | 9/2017 | Bordes et al. |
| 2018/0288441 | A1* | 10/2018 | Zhang .................. H04N 19/14 |
| 2018/0359491 | A1* | 12/2018 | Kang .................. H04N 19/30 |
| 2019/0281286 | A1* | 9/2019 | Park .................. H04N 19/86 |
| 2019/0335179 | A1* | 10/2019 | Sjoberg .............. H04N 19/573 |
| 2019/0349582 | A1* | 11/2019 | Bordes .............. H04N 19/174 |
| 2020/0029071 | A1* | 1/2020 | Kang .................. H04N 19/119 |
| 2020/0177911 | A1* | 6/2020 | Aono .................. H04N 19/139 |

OTHER PUBLICATIONS

Gadde et al., CE2: Tests on SAO Design from JVET-J0021 (CE2.3.2), Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0324.

Bordes et al., CE2-3.3 SAO_Palette Results and Discussion, Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0192-v2.

Chen et al.,"Description of SDR, HDR and 360 video coding by Qualcomm and Technicolor—low and high complexity versions", Joint Video Exploration Team (JVET) of ITU-T SG 16 WP 3 and ISO/IEC JTC 1/SC 29/WG 11, Document: JVET-J0021, 10th Meeting: San Diego, California, USA, Apr. 10-20, 2018, 43 pages.

* cited by examiner

IN-LOOP FILTER WITH MULTIPLE REGIONS

TECHNICAL FIELD

At least one of the present embodiments generally relates to a method or an apparatus for video encoding or decoding.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

In-loop filters allow post-filtering reconstructed pictures to reduce coding artifacts For example, Sample Adaptive Offset (SAO) filtering allows adding offsets to some categories (or classes) of reconstructed samples to reduce coding artifacts. Another example is the Adaptive Loop Filter (ALF) which implements Wiener linear post-filtering of reconstructed samples. Another example is a Deblocking Filter (DBF) which reduces block artifacts with block border smoothing.

SUMMARY

The drawbacks and disadvantages of the prior art are addressed by the general aspects described herein, which are directed to block shape adaptive intra prediction directions in encoding and decoding.

According to a first aspect, there is provided a method. The method comprises steps for determining regions of a picture in which to use common sets of filter parameters for filtering at least one reconstructed block of a picture; obtaining a plurality of sets of filter parameters; filtering a region of said picture comprising the at least one reconstructed block with a common set of filter parameters for blocks within said region; and encoding information in a bitstream comprising syntax indicative of a set of filter parameters used for filtering said region, and an encoded version of said region.

According to another aspect, there is provided a second method. The method comprises steps for decoding syntax from a bitstream indicative of a plurality of sets of filter parameters used for filtering regions of a picture; determining regions of said picture from said bitstream using common sets of filter parameters for filtering at least one reconstructed block of said picture; filtering said at least one reconstructed block with the set of filter parameters associated with the region comprising said at least one reconstructed block; and decoding said filtered reconstructed block of said picture.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

The general aspects described here are in the field of video compression. The general aspects relate to in-loop filtering such as using Sample Adaptive Offset (SAO) using "advance merge" (also known as SAO palette) technique as described in the following commonly owned EP applications, the teachings of which are specifically incorporated herein by reference:

(1) EP Application No. 17305626.8, entitled "A METHOD AND A DEVICE FOR PICTURE ENCODING AND DECODING,", (2) EP Application No. 18305736.3, entitled "ADVANCED MERGE PARALLELIZABLE SAO,", (3) EP Application No. 17305033.7, entitled "A METHOD AND A DEVICE FOR IMAGE ENCODING AND DECODING,", (4) EP Application No. 17305627.6, entitled "A METHOD AND A DEVICE FOR PICTURE ENCODING AND DECODING,".

Figure 1:
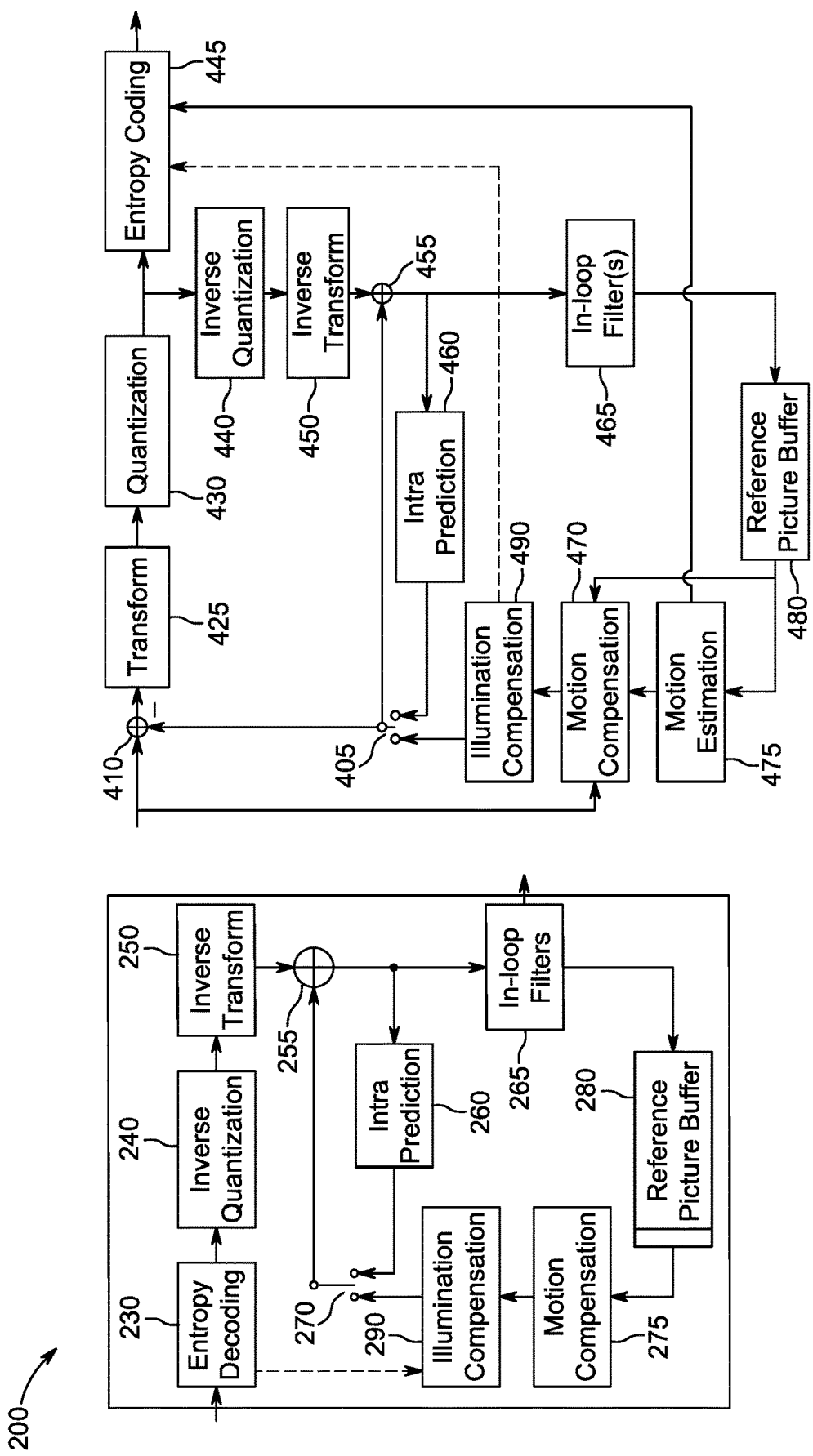
FIG. 1 shows a standard, generic, video decoder (left) and encoder (right).

In-loop filters allow post-filtering the reconstructed pictures to reduce coding artifacts (see blocks 265 and 465 in a classical decoder and encoder scheme of FIG. 1). For example, SAO allows adding offsets to some categories (or classes) of reconstructed samples to reduce coding artifacts. Another example is the Adaptive Loop Filter (ALF) which implements Wiener linear post-filtering of reconstructed samples. Another example is a Deblocking Filter (DBF) which reduces block artifacts with block border smoothing.

Generally, an in-loop filter (k) process (decoder side) is comprised of the following steps:

1) parsing of the C(k) filter parameter sets P(c); c=0 . . . C(k)

2) Classification of the reconstructed samples into C(k) classes

3) Filtering the reconstructed samples belonging to class c with parameters P(c)

Generally, an in-loop filter (k) process (encoder side) is comprised of the following steps:

1) Classification of the reconstructed samples into C(k) classes

2) Deriving the C(k) filter parameter sets P(c); c=0 . . . C(k)

3) Filtering the reconstructed samples belonging to class c with parameters P(c)

The purpose of the aspects described herein is to improve the in-loop filters performance by using region-based post-filtering.

In HEVC (High Efficiency Video Coding), when enabled, the Coding Tree Unit (CTU) can be coded with 3 SAO modes (SaoTypeIdx): inactive (OFF), edge offset (EO) or band offset (BO). In case of EO or BO, one set of parameters per channel (Y, U, V) is coded, possibly shared with neighboring CTUs (see SAO MERGE flag). The SAO mode is the same for Cb and Cr components.

Figure 2:
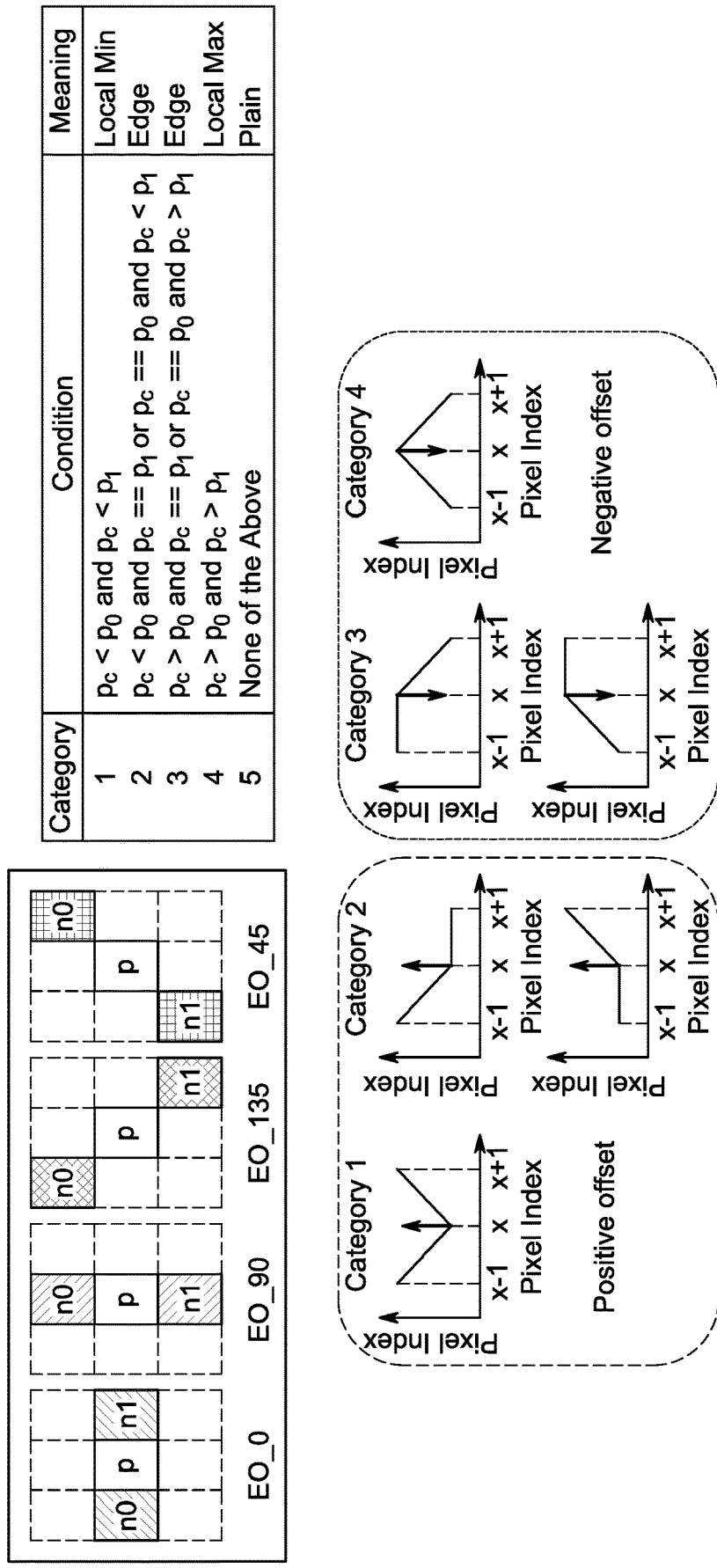
FIG. 2 shows determination of a reconstructed sample category in the case of EO mode.

In case of EO, each reconstructed sample is classified into NC=5 categories (sao_eo_class), depending on the local gradients, as depicted in FIG. 2. (NC−1) offset values are coded, one for each category (one category has offset equal to zero).

Figure 3:
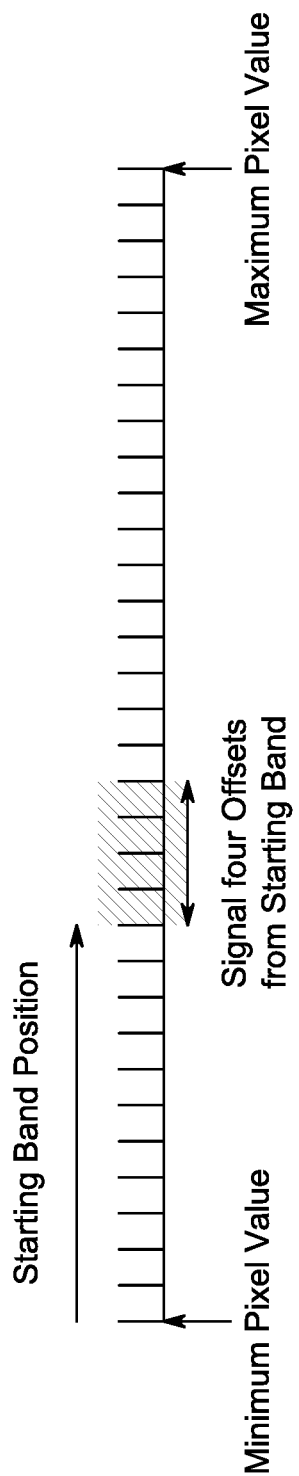
FIG. 3 shows in the case of BO mode, the pixel range from 0 . . . 255 (in 8-bit) is uniformly split into 32 bands.

In case of BO, the pixel range of values (e.g.: 0 . . . 255, in 8-bit) is uniformly split into 32 bands and the sample values belonging to (NC−1)=4 consecutive bands are modified by adding an offset, off(n). FIG. 3 shows an example of 4 consecutive bands. (NC−1) offset values are coded, one for each of the (NC−1) bands (the remaining bands have offset equal to zero).

Figure 4:
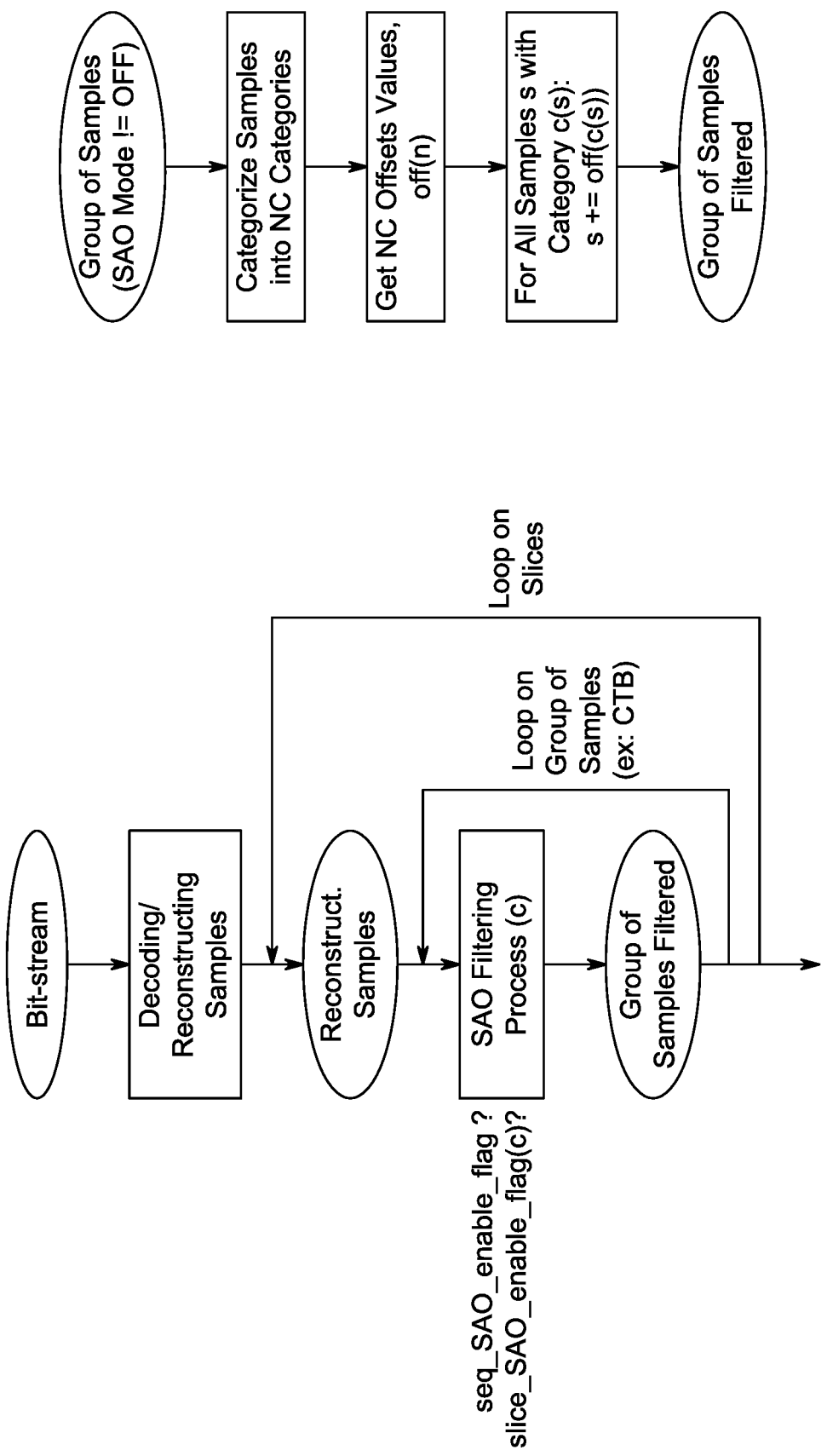
FIG. 4 shows picture based SAO filtering calling the "SAO filtering process" for each group of samples (left), and "SAO filtering process" (right).
Figure 5:
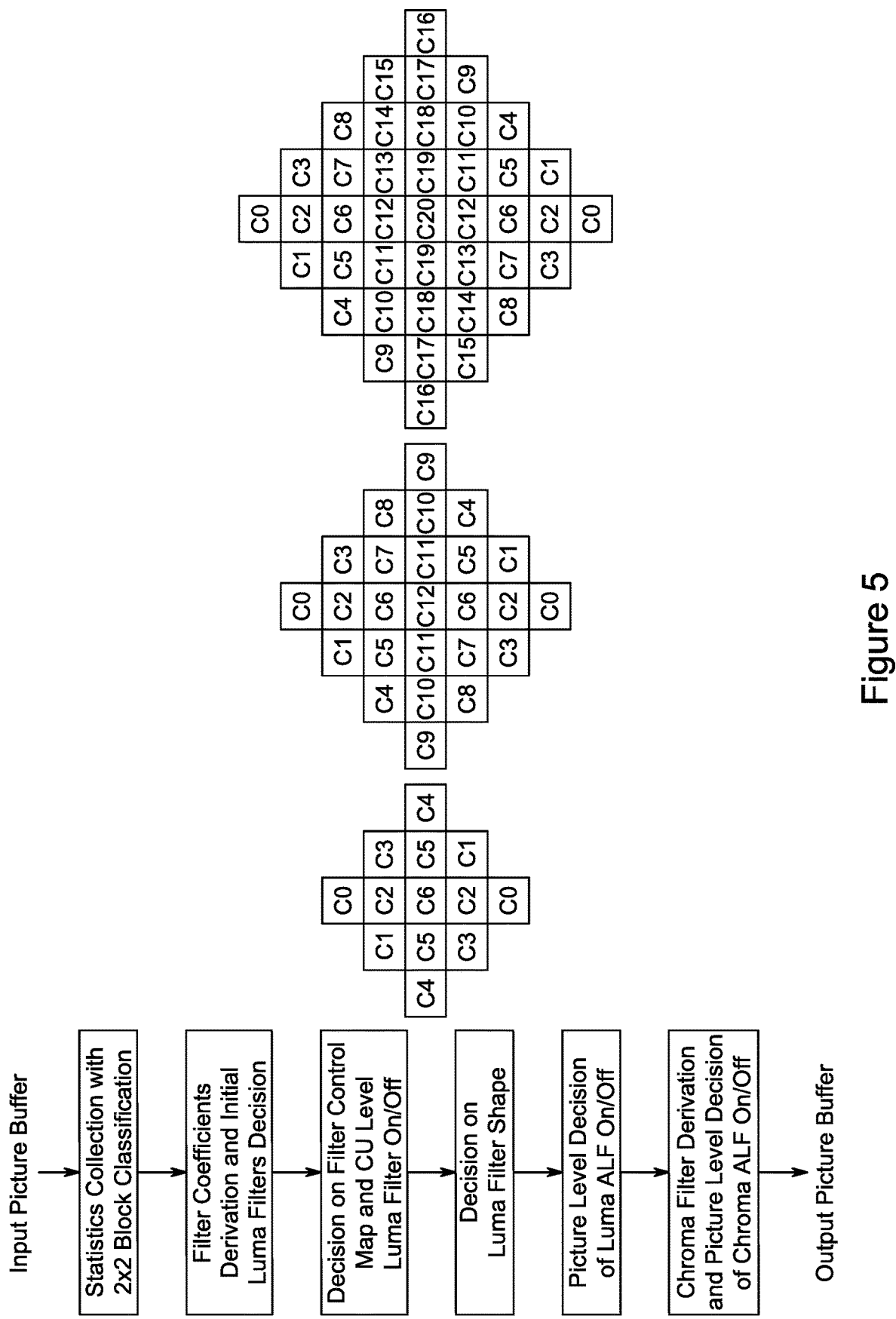
FIG. 5 shows a flow chart of an encoder decision for ALF (left) and examples of ALF filter shapes (right).

In case of EO or BO, the offsets are possibly not coded but copied from the neighboring above or left CTU (Merge mode). FIG. 4 depicts the way SAO is processed over the picture (left) and the SAO filtering process itself for each CTU (right).

In EP Application No. 17305627.6, entitled "A METHOD AND A DEVICE FOR PICTURE ENCODING AND DECODING," it is proposed to collect all the samples of the reconstructed picture using, or sharing, the same SAO parameters to derive the optimal SAO parameters sets.

ALF Filter

In JEM software, each 2×2 block is categorized into one of 25 classes, based on its directionality and its activity, using local gradients. Next, the ALF filter coefficients are derived for each class for the whole picture.

For luminance samples of each CTU (filter block), the encoder decides whether the ALF is applied and the appropriate signaling flag is included in the slice header. For chroma samples, the decision to apply the filter is done based on the picture-level rather than at the CTU-level.

The ALF filter parameters can be signalled in the first CTU or in the slice header. Up to 25 sets of luminance filter coefficients can be signalled. To reduce overhead bits, filter coefficients of different classifications can be merged. Also, the ALF coefficients of reference pictures are stored and allowed to be reused as ALF coefficients for a current picture (ALF temporal prediction).

To support ALF temporal prediction, a candidate list of ALF filter sets is maintained. At the beginning of decoding a new sequence, the candidate list is empty. After decoding one picture, the corresponding set of filters may be added to the candidate list. The temporal prediction of ALF coefficients improves coding efficiency for inter coded frames. To improve coding efficiency when temporal prediction is not available (intra frames), a set of 16 fixed filters is also assigned to each class.

Advanced Merge SAO and Other Features

Figure 6:
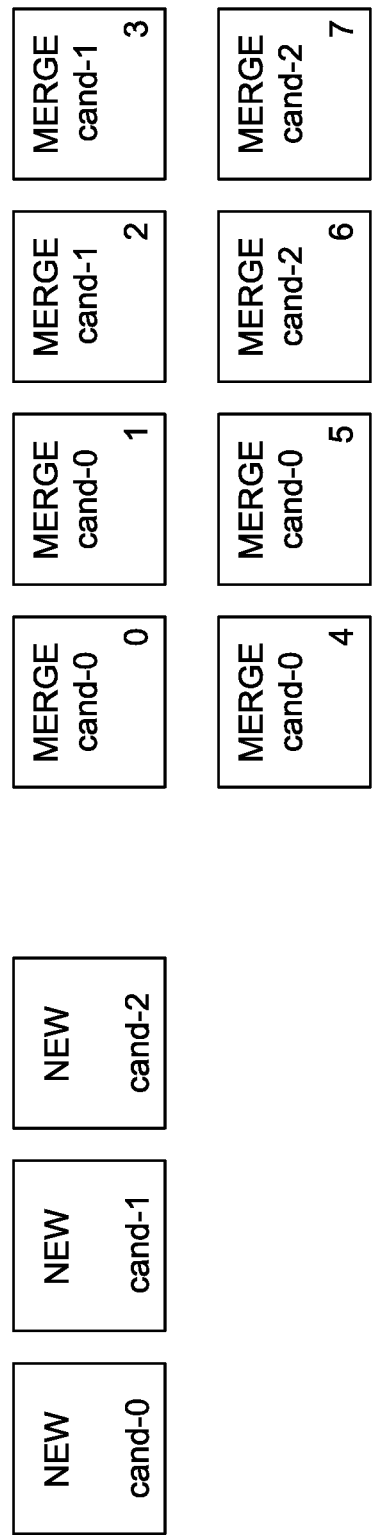
FIG. 6 shows CTUs referring to previously encoded list of (NEW) SAO parameters.
Figure 7:
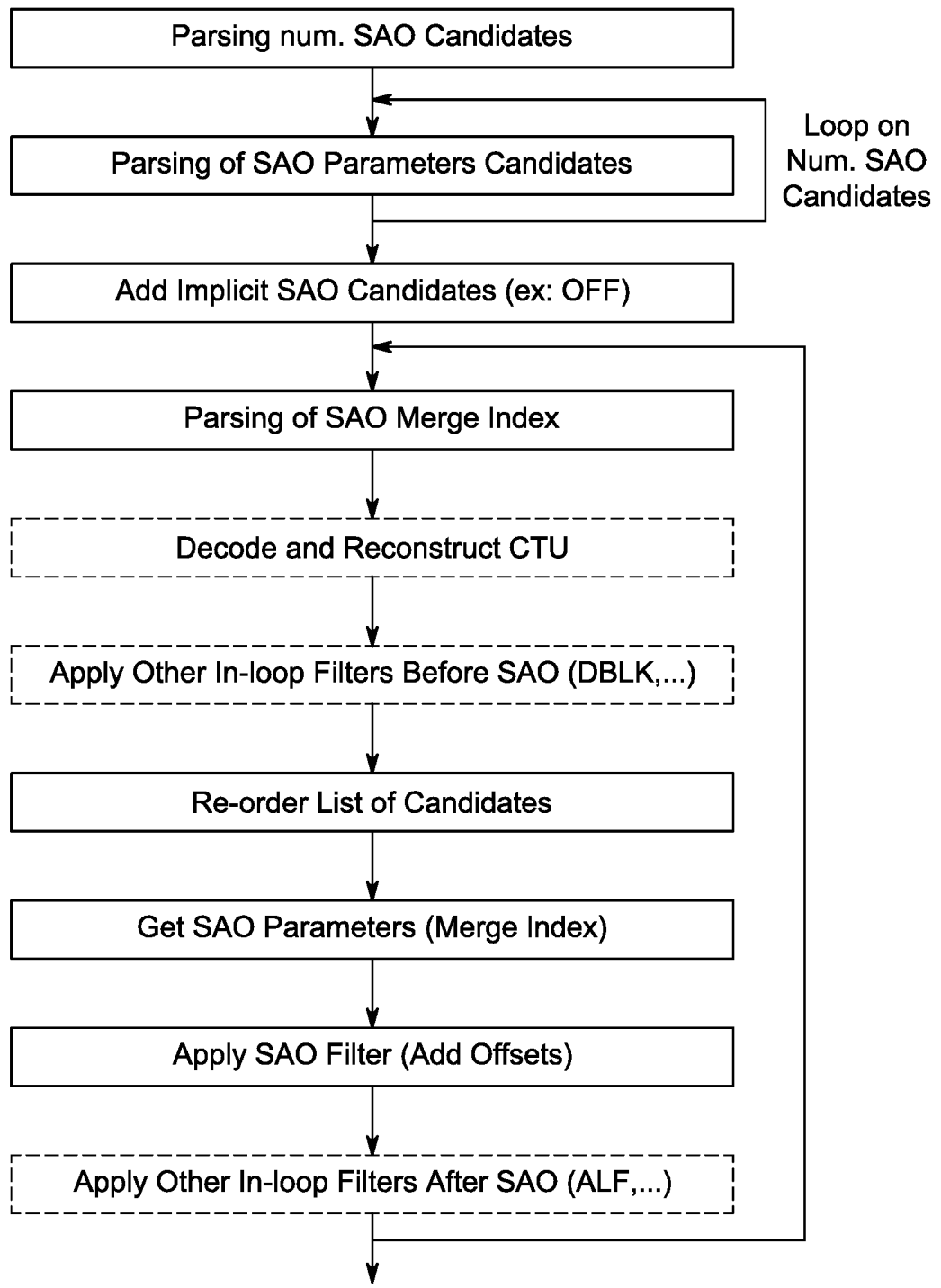
FIG. 7 shows an example of a proposed decoding and reconstructing process of the SAO filter.

Feature 1:

In EP Application No. 17305626.8, entitled "A METHOD AND A DEVICE FOR PICTURE ENCODING AND DECODING," all the SAO parameters (list of SAO parameters candidates) are encoded first (in the slice header or with the first CTU for example) followed by the SAO blocks containing a (merge/candidate) index referring to this list of SAO parameters (NEW Candidates) which have been previously defined and encoded as depicted in FIG. 6.

The number of SAO candidates (nb_sao_cand) and the list of SAO parameters is encoded in the same order as the order of use. At the encoder, the list of SAO parameters candidates is re-ordered after encoding each candidate index, putting the latest used parameter on top of the list. More precisely, the list of candidates is re-ordered such that the spatially closest used candidates are ordered at first. This can be done by building a map of last-used candidates.

The OFF (all offsets are zero for all components) candidate is placed implicitly in the list, but not explicitly coded, at a position not too far from to the top (ex: position<=2).

Feature 2:

In EP Application No. 18305736.3, entitled "ADVANCED MERGE PARALLELIZABLE SAO," the principle of EP Application No. 17305626.8, entitled "A METHOD AND A DEVICE FOR PICTURE ENCODING AND DECODING," is extended so that the regions where the current SAO block can inherit from other SAO block parameters is constrained:
  to be in the Wavefront parallel causal area,
  and/or so that the number of candidates in the re-ordered list of SAO candidates is lower than a pre-defined value (see "list_reordered_size" in PF180072)
  and/or so that the number of candidates is limited by the maximum distance (dist_max) of the candidates to the current SAO block.

Figure 8:
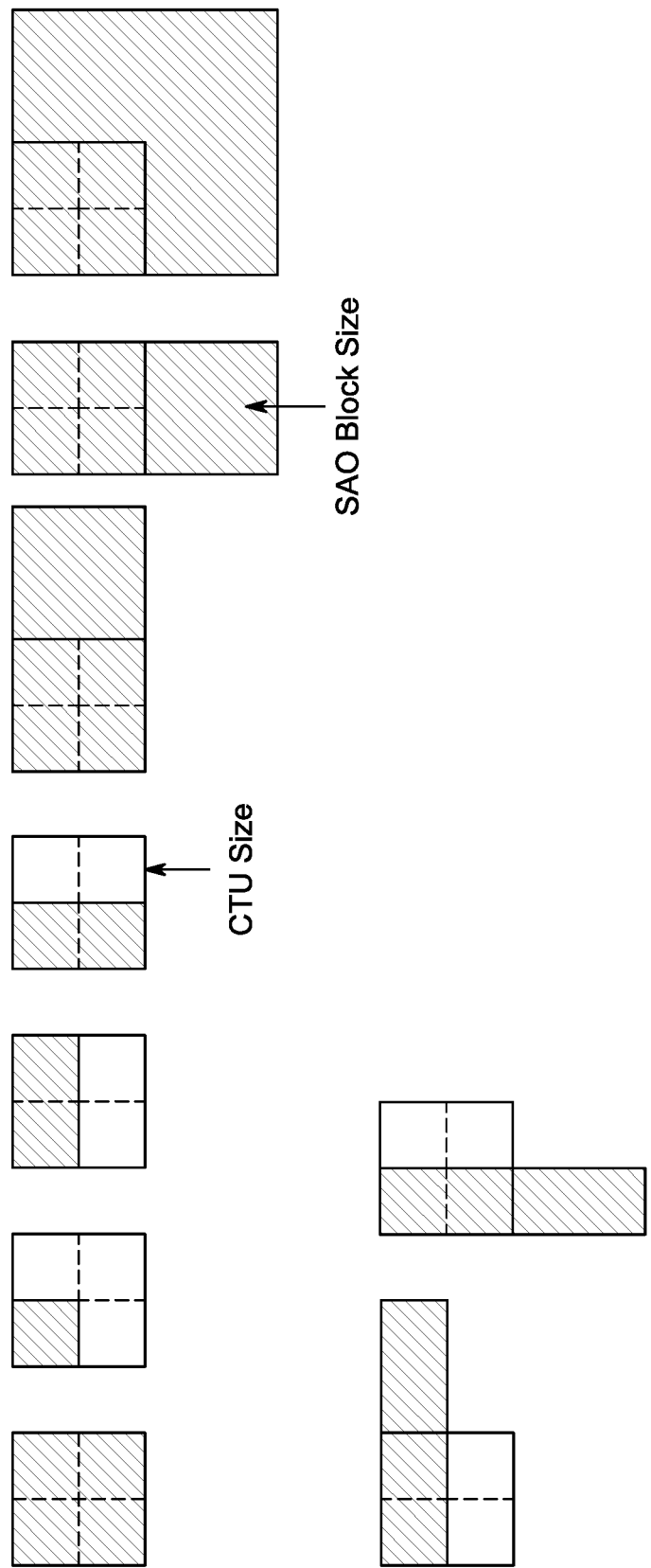
FIG. 8 shows an example of SAO block sizes defined relative to CTU size.

Feature 3:

In EP Application No. 17305033.7, entitled "A METHOD AND A DEVICE FOR IMAGE ENCODING AND DECODING," and in EP Application No. 17305626.8, entitled "A METHOD AND A DEVICE FOR PICTURE ENCODING AND DECODING," the size of the SAO block (that is the size where the SAO parameters apply) is coded in the slice header. In EP Application No. 17305626.8, entitled "A METHOD AND A DEVICE FOR PICTURE ENCODING AND DECODING," the width and/or height of the SAO block is a multiple N of the CTU size, where N=1, 2 or ½, for example (see FIG. 8).

Figure 9:
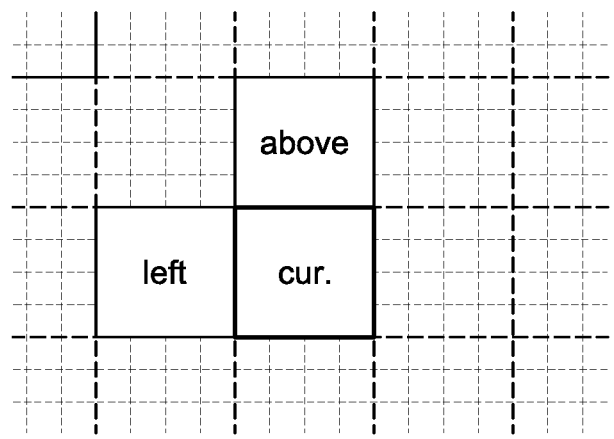
FIG. 9 shows a current SAO block can inherit parameters from left or above neighbors.

In an article entitled "Description of SDR, HDR and 360° video coding technology proposal by Qualcomm and Technicolor—low and high complexity versions," 10th JVET Meeting, San Diego, Calif., USA, April 2018, JVET-J0021, and in an article by A. Gadde, D. Rusanovskyy, M. Karczewicz, entitled "CE2: Tests on SAO design from JVET-J0021 (CE2.3.2)," 11th JVET Meeting: Ljubljana, SI, 10-18 Jul. 2018, JVET-K0324, it is proposed to encode two flags (merge_left_flag and merge_above_flag) to indicate whether the current SAO block inherits from left or above or another neighbor (see FIG. 9). At the parsing stage, it is checked whether the left and above SAO parameters are identical, then the above flag is not parsed (inferred to be false). In other cases, the current SAO block is marked as "active" and the SAO parameters are not inherited but encoded/decoded.

All the information is decoded at the beginning of the slice or picture. After parsing the merge flags for all the SAO blocks, the SAO parameters of the SAO blocks marked as "active" are decoded.

In an article by P. Bordes, F. Racapé, entitled "CE2-3.3 SAO_Palette results and discussion," 11th JVET Meeting: Ljubljana, SI, 10-18 Jul. 2018, JVET-K0192, it is reported the combination of techniques just mentioned provides BD-rate gains of 0.17% in AI, 0.38% in RA and 0.52% in LDB for luminance using common test conditions (CTC) respectively, with JVET reference software (VTM 1.0).

In JVET-K0324, it is reported BD-rate gains of 0.11% in AI, 0.30% in RA and 0.43% in LDB with same conditions.

In at least some of the embodiments described herein, the purpose of the general aspects described is:
  to combine the two approaches to leverage the coding gains of both techniques.
  to avoid the problem of parsing all the filter parameters at the beginning of the slice/picture, which introduces one-frame latency.
  to potentially share the group (region) of reconstructed samples used for several (more than one) in-loop filters for post-filters parameters derivation.

In at least one embodiment, the general aspects of in-loop post filters such as SAO or ALF in EP Application No. 17305626.8, entitled "A METHOD AND A DEVICE FOR PICTURE ENCODING AND DECODING," (see features 1, 2, 3: signaling SAO or ALF parameters sets first, and referring to them using an index, enabling/disabling filter for current block, etc. . . . ) are extended to multiple regions individually inside the slice or picture. These features can be combined with capability to adapt the post-filter block size per slice or picture. Several different post-filters can share the same region. Another concept in an encoder, for example, is to compute the post-filter parameters per region.

Figure 10:
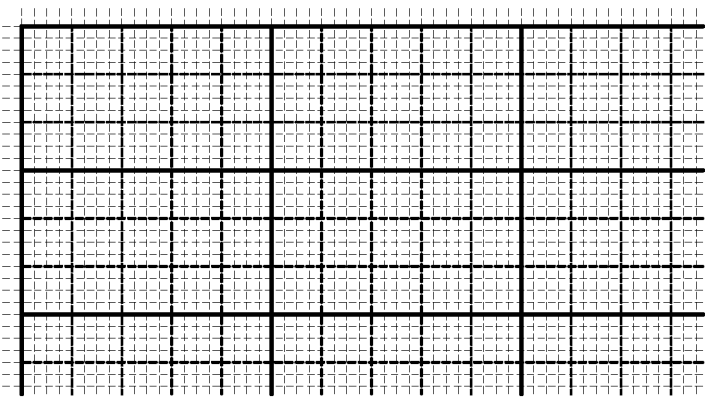
FIG. 10 shows a filter region can be rectangular or one line/column of filter blocks.

In a first embodiment, one defines a filter region associated with each filter block. The filter block is the size for which the set of filter parameters are the same. Then each filter block belongs to one filter region. The filter region is a sub-part (sub-set of filter blocks) of the slice or the picture. The filter region can be rectangular (ex: tiles) as depicted in FIG. 10, or one line/column of filter blocks. The filter region can also correspond to the entire slice or picture. The size or the shape (for instance coded as a map) of filter regions is coded in a slice, picture or sequence header typically.

For an SAO filter, a current filter block belonging to one region can inherit SAO parameters from candidate SAO parameters corresponding to SAO blocks inside the same region.

In a second embodiment, for an SAO filter, the syntax is changed as follows:
  sao_palette_index is parsed at first for each SAO block
  if sao_palette_index is equal to a value idx_new (ex: idx_new=3), then the SAO block is marked as NEW (new_flag=true), meaning that it is the first time this SAO parameter is used in the current filter region.

At the parsing stage, if sao_palette_index=idx_new, then SAO parameters are parsed after the parsing of sao_palette_index and made available for the other SAO blocks of the region at the filtering stage. At the filtering stage, the SAO parameters are added to the list of SAO parameters available for merge (inheritance) for the other candidates of the current SAO region.

In a variant of this second embodiment, the value of idx_new can change per slice or per region. It can be coded in the slice header or with the first SAO block or it can be derived from other parameters such as being a function of the quantization parameter (QP).

In another variation of the second embodiment, for an ALF filter, the set of ALF filter parameters can be signalled in the first filter block of the region, or in the region header (e.g. if the region is a tile as defined in HEVC) or in a slice/picture header. The set of ALF filter parameters remains the same for all the filter blocks in this region.

In another variant, when the filter supports temporal prediction (e.g. ALF temporal prediction), the list of sets of filter parameters is maintained per region and the filter blocks of the current region can use filter parameters corresponding to the co-located regions in reference pictures.

In one other variation of the second embodiment, the number of SAO blocks marked as NEW in the region is coded at the beginning of the region (e.g.: with the first SAO block of the region).

Figure 11:
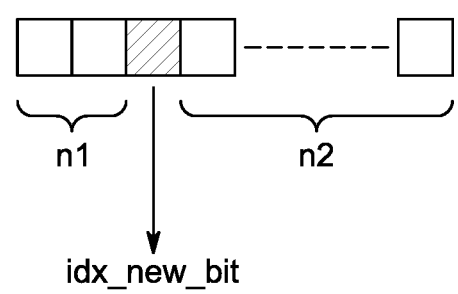
FIG. 11 shows an example of coding sao_palette_index and new_flag.
Figure 12:
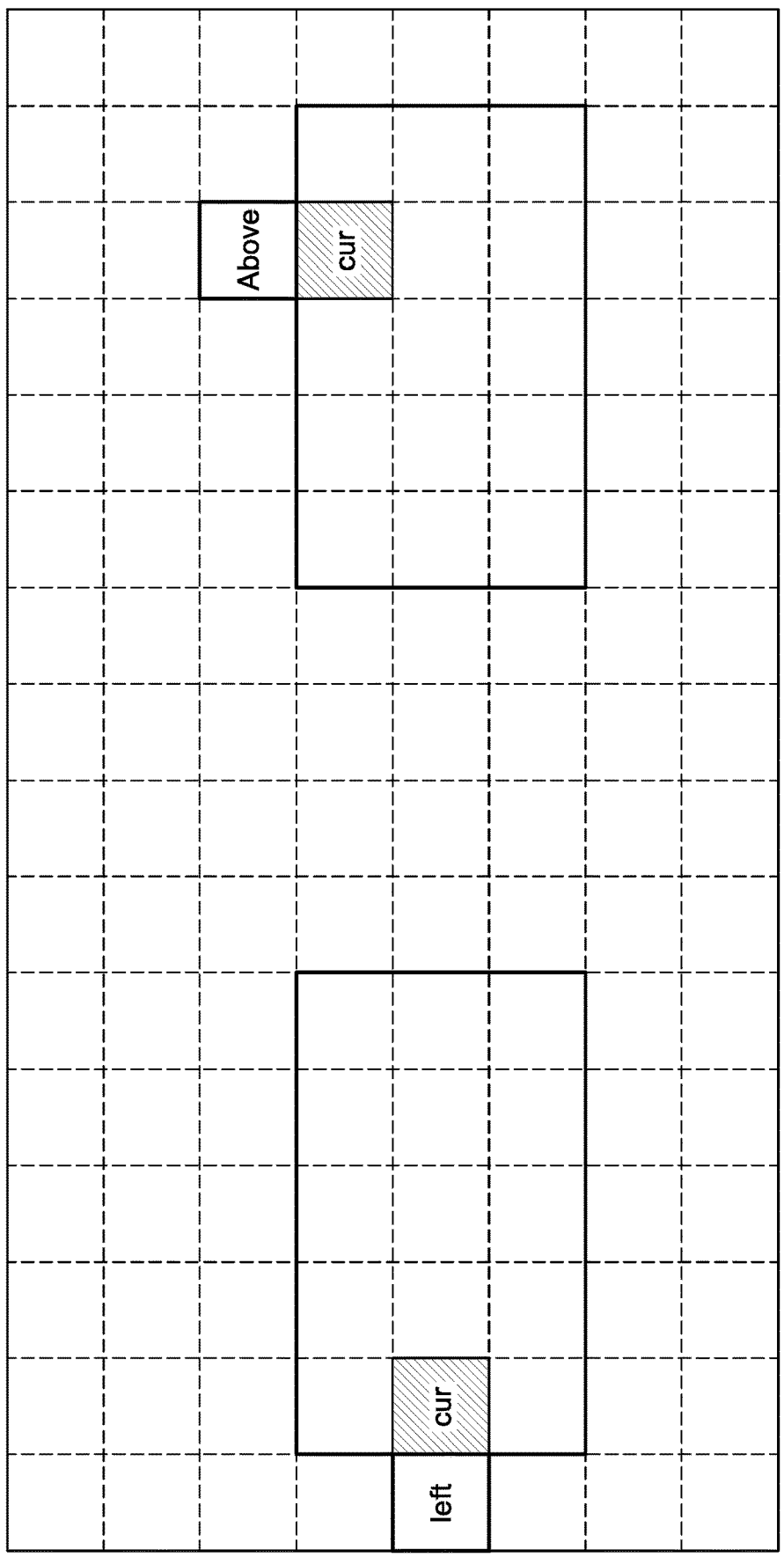
FIG. 12 shows a current SAO block may inherit parameters from left or above neighbors outside the SAO region.

In a third embodiment, the value of sao_palette_index is coded with n1+1+n2 bits, and the new_flag is the $n1^{th}$ bit (idx_new_bit) as shown in FIG. 11 where n1 and n2 are either redefined parameters, or parameters varying adaptively, conditionally to the context.

In a variation of this embodiment, n1<=2 and the two n1 bits are the merge_left_flags and merge_above_flag. Advantageously, if the above and left parameters are identical, the merge_above_flag is not coded as in JVET-J0021 and JVET-K0324.

In a fourth embodiment, for SAO blocks in the first column of the SAO region (or SAO blocks in the first line of the SAO region), the list of SAO parameters available for merge also contains the left (or above) SAO block parameters outside the SAO region.

Advantageously, when decoding the first SAO block of the region, the left column outside the current region and the above line of SAO blocks parameters are added to the list of current SAO region.

In a fifth embodiment, the filter block size may change per region. The filter block size is coded for each region or it can be inferred from other coding parameters such as the quantization parameter (QP), based on pre-defined tables or derivation rules.

For instance, a basic block size is defined in the SPS, PPS or slice header (e.g., 128×128), and a QP table is used indicating a scaling factor to apply to the filter block width and height. An example of such table is given below.

|  | QP range | | | |
| --- | --- | --- | --- | --- |
|  | 1-25 | 26-35 | 36-45 | 46-51 |
| scaling | x0.5 | x1 | x2 | x2 |

In a sixth embodiment, the filter block parameters can be parsed in classical raster scan order in the slice. Next the filtering stage is carried out region by region (see FIG. 13 left). The SAO filtering stage groups the SAO candidates list, reordering the association of SAO parameters to every SAO blocks, the samples' classification and the application of the SAO offsets to correct the reconstructed samples.

The ALF filtering stage groups the samples' classification and the filtering of the reconstructed samples.

Figure 13:
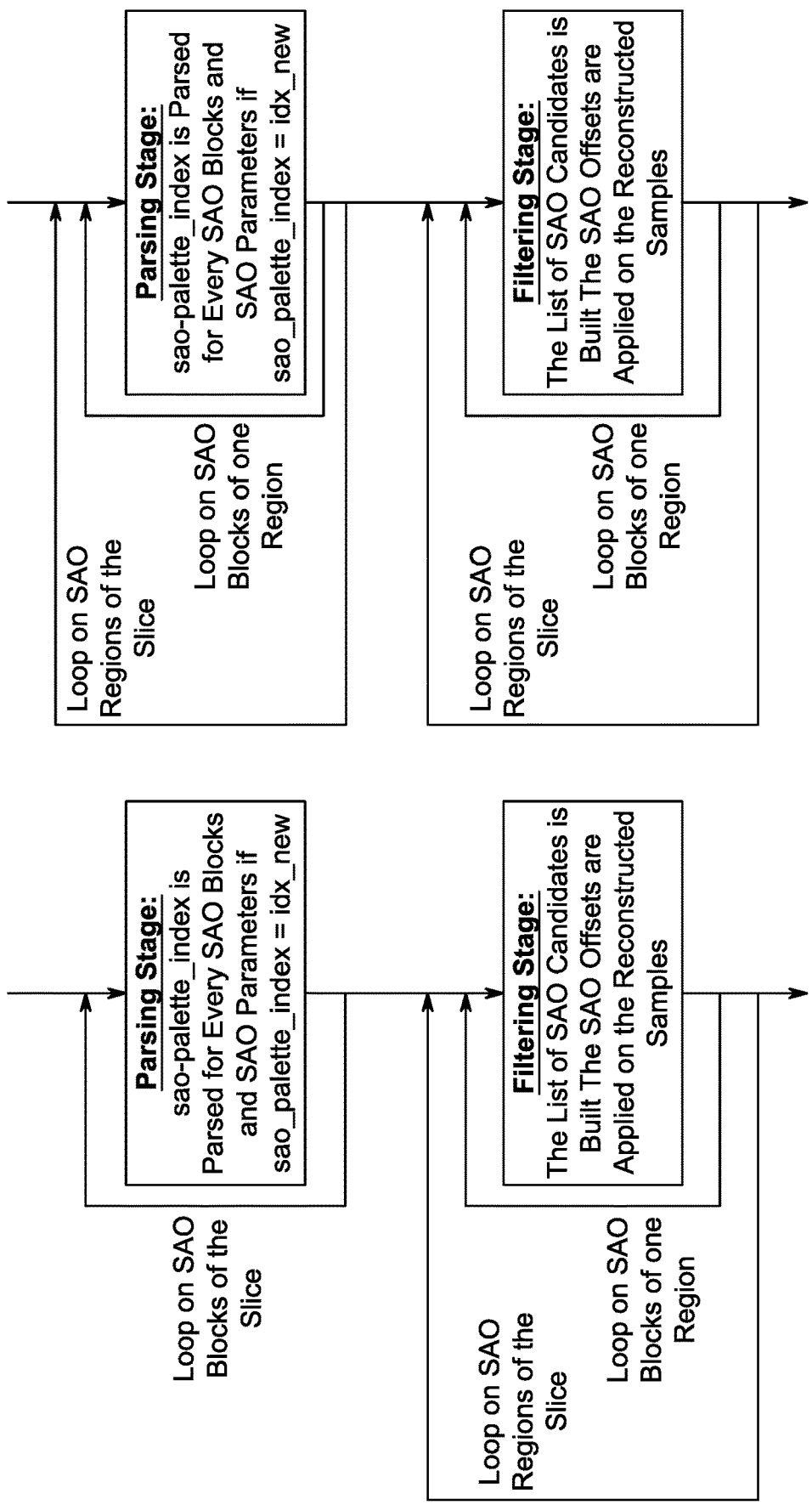
FIG. 13 shows (left) parsing of the filter parameters is made in raster scan order for all blocks and the filtering is carried out per region, and (right) both parsing and filtering is region-based.

Alternatively, the filter block parameters can be parsed region per region (using a raster scan of filter blocks in the filter region typically) and next the filtering stage is carried on region by region (see FIG. 13 right).

Figure 14:
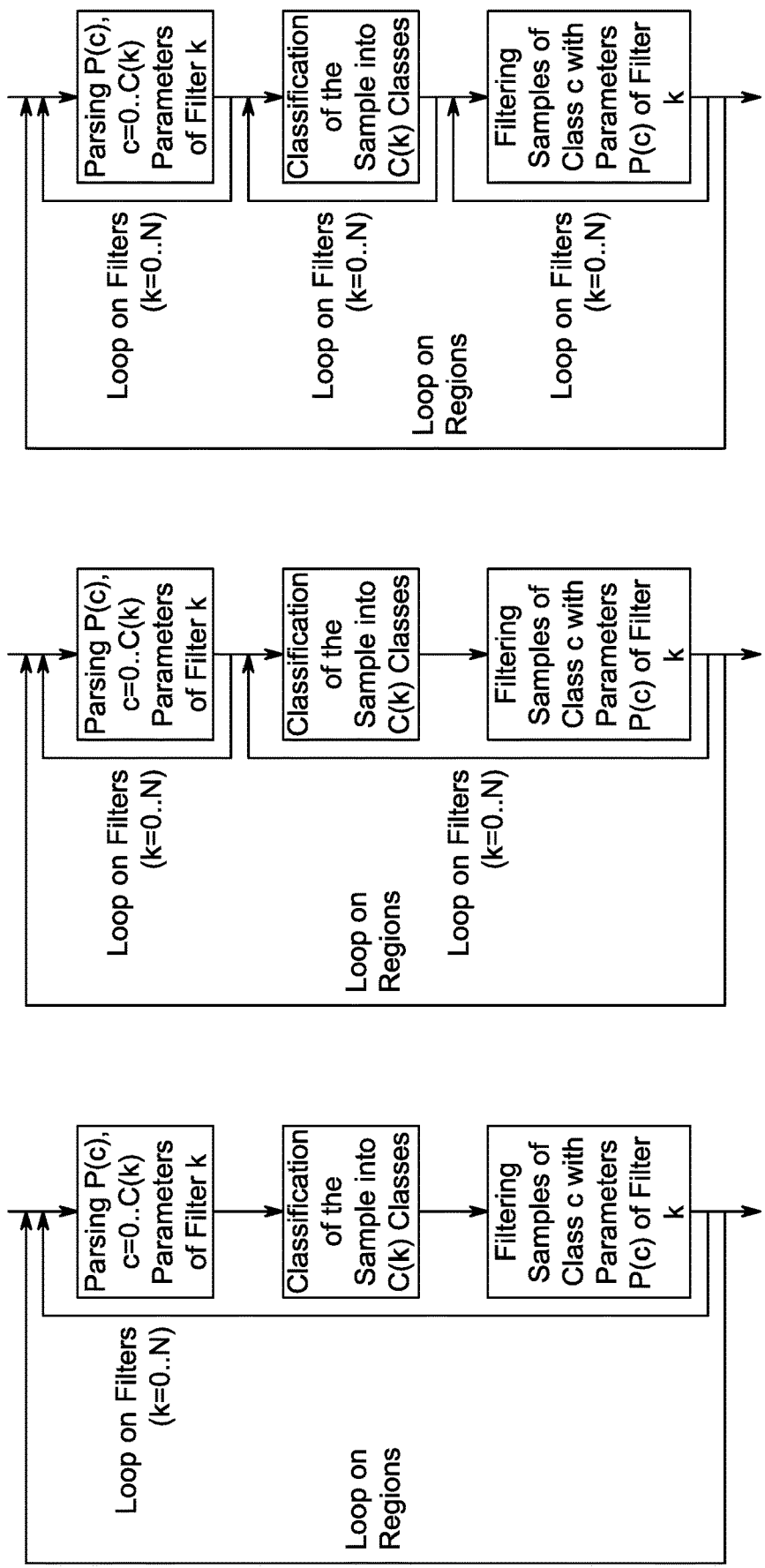
FIG. 14 shows that several post-filters can share the same region.

In a seventh embodiment, several different in-loop filters k (k=0, . . . , N) can share the same filter region so that the process of parsing and filtering for several filters is made region-based. The order of parsing/classifying/filtering can be interleaved in-between filters inside one region as depicted in FIG. 14.

In an eighth embodiment, advantageously, several different post-filters may share the same classification process so that $c(k1)=c(k2)$ with k1 different from k2. This means that the set of samples belonging to one class for filter k1 is the same as the set of samples belonging to one class for filter k2. In that case, the classification is made once for this class. Other variants of different filters sharing a same classification process can be used.

The proposed techniques allow improvement of the overall video compression process. The techniques are lightweight in terms of memory access. The techniques improve the post-filtering process by grouping the different filtering stages region-based and making the post-filtering paralellizable. This is achieved through the improvement of in-loop filtering.

The proposed modifications to the state-of-art SAO filter (existing standardized HEVC) or ALF re-use most of the traditional SAO or ALF block-level logic/operations. Consequently, the existing design of HEVC or JEM codecs using post-filters can be maximally reused, thereby reducing the implementation costs of the proposed techniques.

This document describes a variety of aspects, including tools, features, embodiments, models, approaches, etc. Many of these aspects are described with specificity and, at least to show the individual characteristics, are often described in a manner that can sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 15:
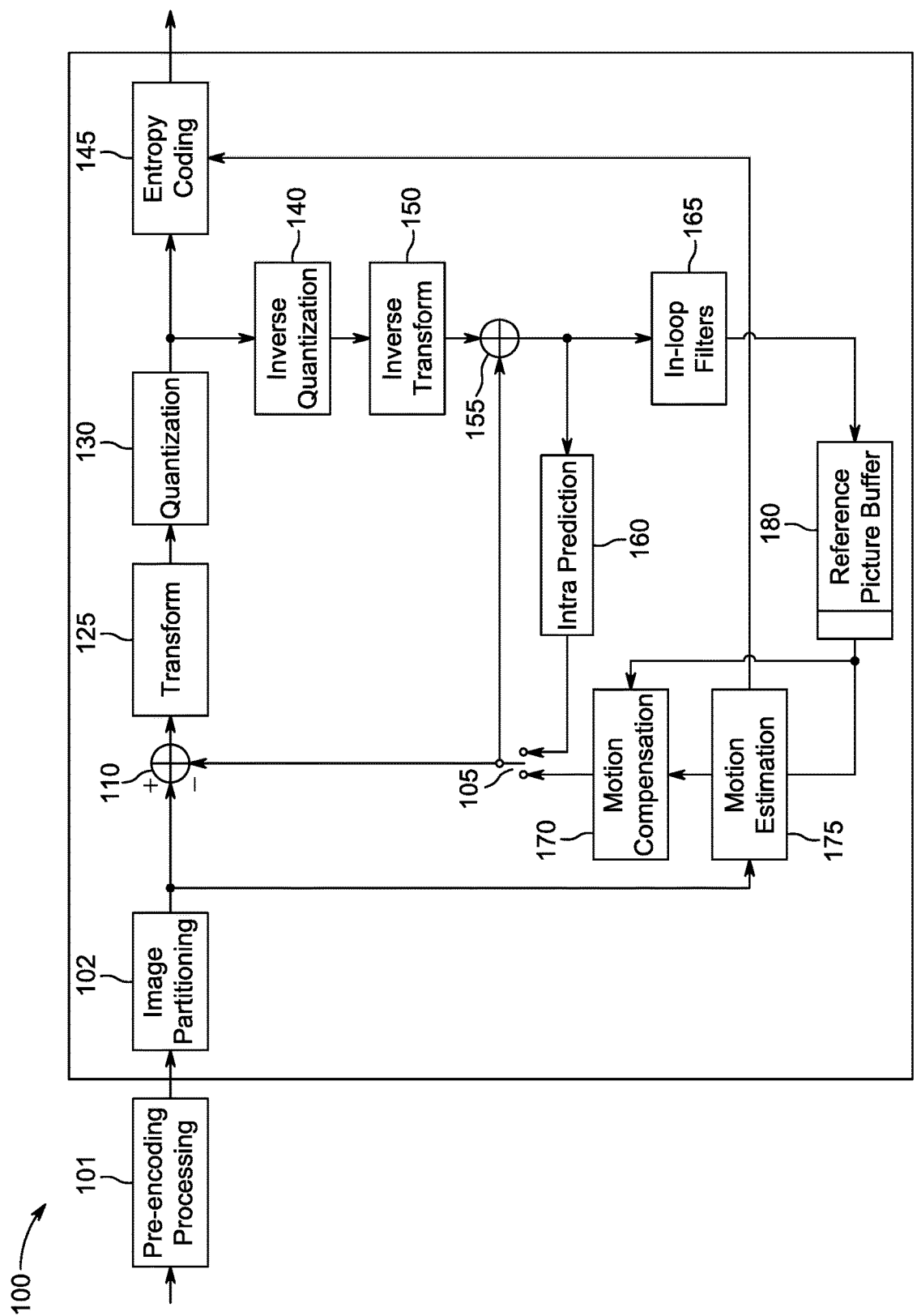
FIG. 15 shows a generic, standard encoding scheme.
Figure 16:
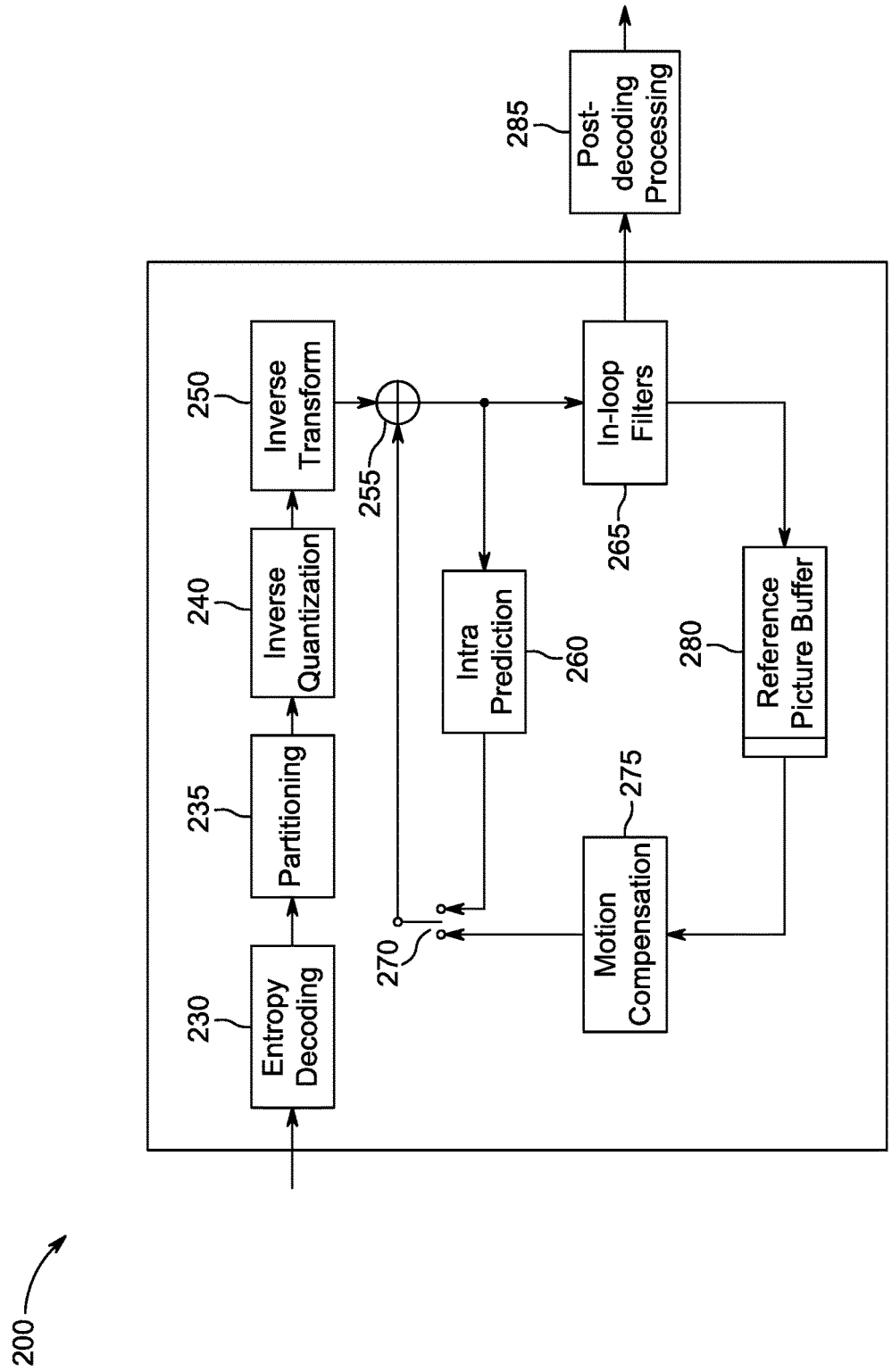
FIG. 16 shows a generic, standard decoding scheme.
Figure 17:
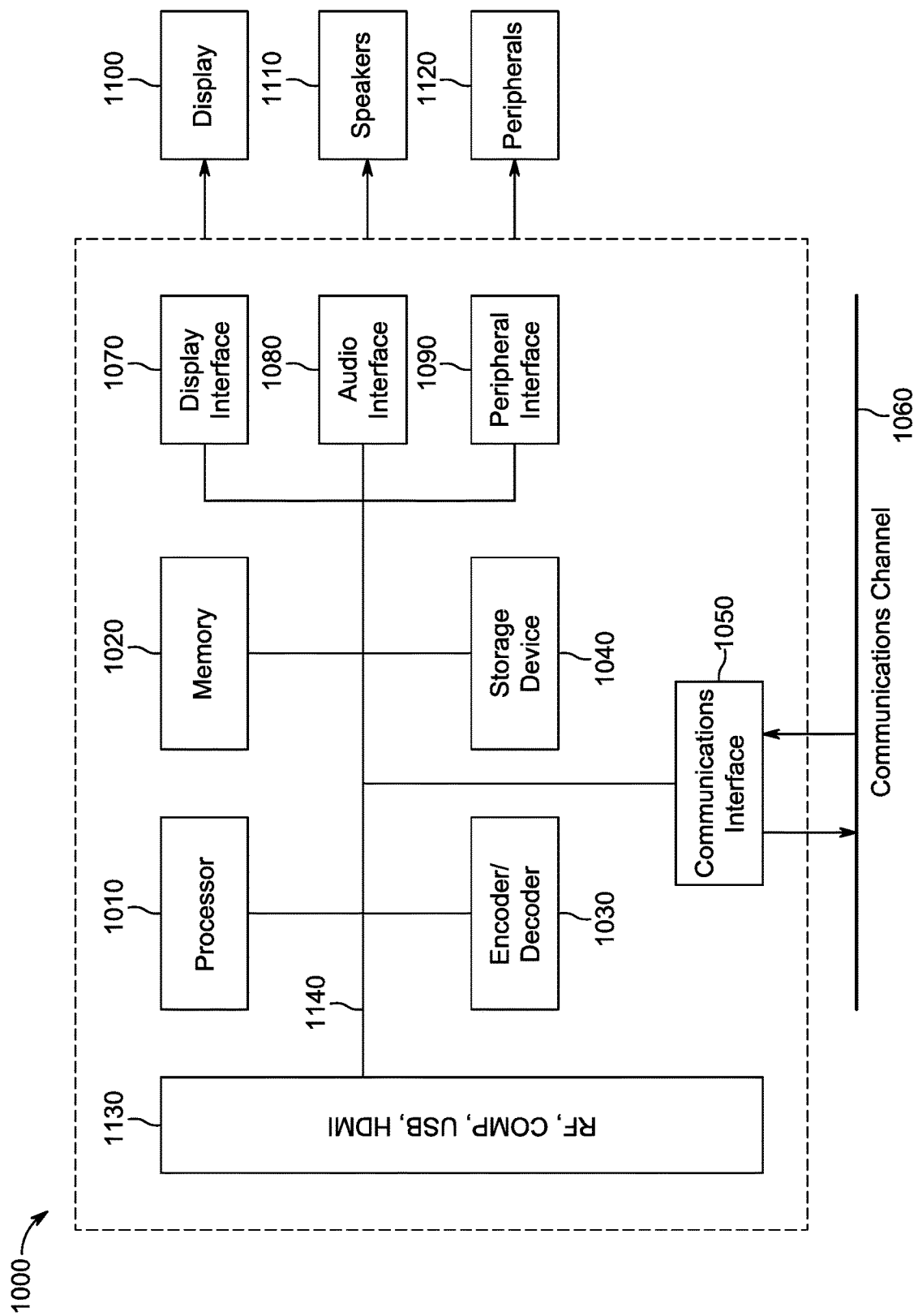
FIG. 17 shows a typical processor arrangement in which the described embodiments may be implemented.

The aspects described and contemplated in this document can be implemented in many different forms. FIGS. 15, 16 and 17 below provide some embodiments, but other embodiments are contemplated and the discussion of FIGS. 15, 16 and 17 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the intra prediction, entropy coding, and/or decoding modules (160, 360, 145, 330), of a video encoder 100 and decoder 200 as shown in FIG. 15 and FIG. 16. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example, $\{\{1,0\}, \{3,1\}, \{1,1\}\}$. The specific values are for example purposes and the aspects described are not limited to these specific values.

FIG. 15 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 16 illustrates a block diagram of a video decoder 200. In the decoder 200, a bitstream is decoded by the decoder elements as described below. Video decoder 200 generally performs a decoding pass reciprocal to the encoding pass as described in FIG. 15. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 17 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the 12C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a wireless network, such as IEEE 802.11. The wireless signal of these embodiments is received over the communications channel 1060 and the communications interface 1050 which are adapted for Wi-Fi communications, for example. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting an index of weights to be used for the various intra prediction reference arrays.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, weighting of intra prediction reference arrays.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion calculation or rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of weights to be used for intra prediction reference arrays. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Embodiments may include one or more of the following features or entities, alone or in combination, across various different claim categories and types:

Modifying the in-loop filter process applied in the decoder and/or encoder.

Enabling several sets of filtering parameters and regions in the decoder and/or encoder.

Inserting in the signaling syntax elements that enable the decoder to identify the regions where a set of filter parameters are to be applied for in-loop filtering.

Selecting, based on these syntax elements, a set of filter parameters to apply at the decoder.

Applying in-loop filtering such as Adaptive Loop Filtering and Sample Adaptive Offset filtering at a decoder.

Performing in-loop filtering at an encoder according to any of the embodiments discussed.

A bitstream or signal that includes one or more of the described syntax elements, or variations thereof.

Creating and/or transmitting and/or receiving and/or decoding a bitstream or signal that includes one or more of the described syntax elements, or variations thereof.

A TV, set-top box, cell phone, tablet, or other electronic device that performs in-loop filtering according to any of the embodiments described.

A TV, set-top box, cell phone, tablet, or other electronic device that performs in-loop filtering according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs in-loop filtering according to any of the embodiments described.

A TV, set-top box, cell phone, tablet, or other electronic device that receives (e.g. using an antenna) a signal over the air that includes an encoded image, and performs in-loop filtering according to any of the embodiments described.

Various other generalized, as well as particularized, inventions and claims are also supported and contemplated throughout this disclosure.

Figure 18:
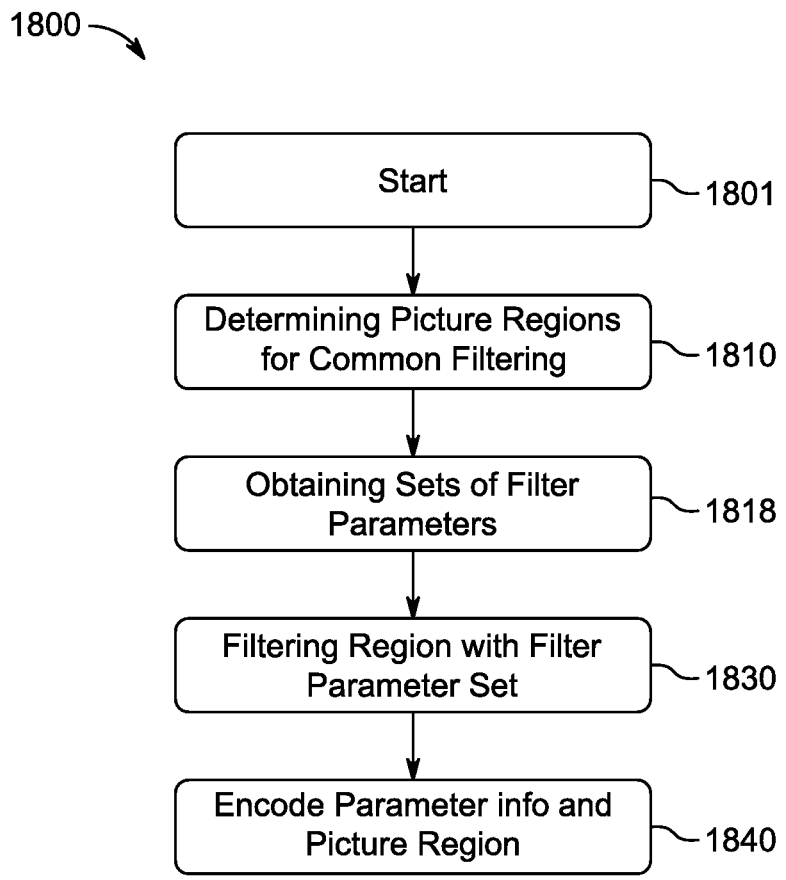
FIG. 18 shows an embodiment of a method for encoding using in-loop filtering with multiple regions.

One embodiment of a method 1800 for encoding a block of video data using the general aspects described here is shown in FIG. 18. The method commences at Start block 1801 and control proceeds to function block 1810 for determining regions of a picture in which to use common sets of filter parameters for filtering at least one reconstructed block of a picture. Control then proceeds from block 1810 to block 1920 for obtaining a plurality of sets of filter parameters. Control proceeds from block 1820 to block 1830 for filtering a region of the picture comprising the at least one reconstructed block with a common set of filter parameters for blocks within the region. Control then proceeds from block 1830 to block 1840 for encoding information in a bitstream comprising syntax indicative of a set of filter parameters used for filtering the region, and an encoded version of the region.

Figure 19:
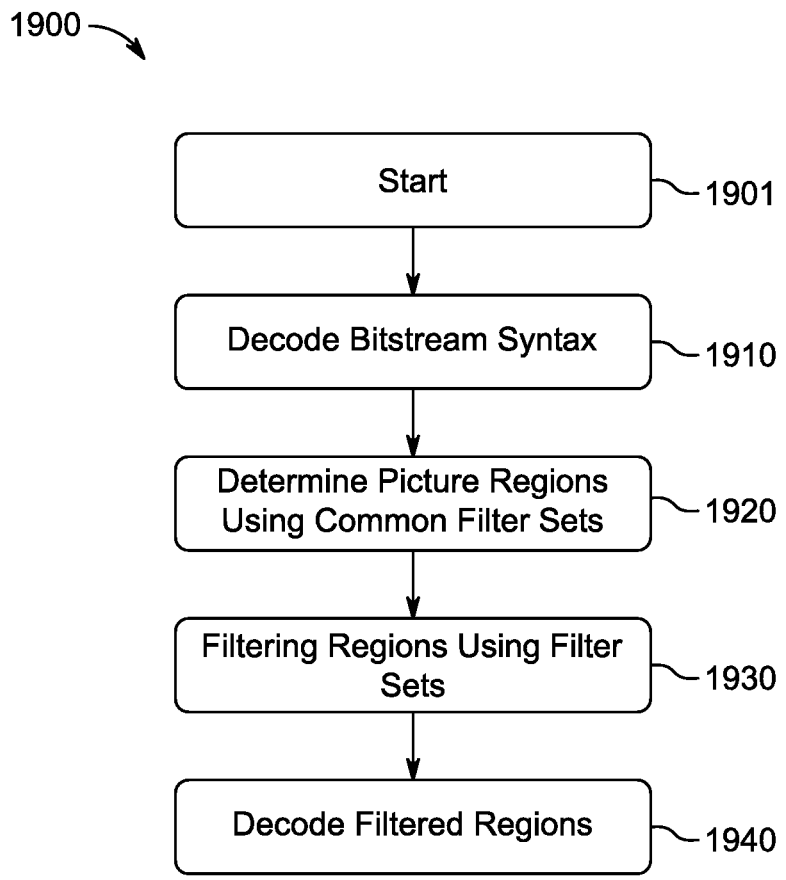
FIG. 19 shows an embodiment of another method for decoding using in-loop filtering with multiple regions.

One embodiment of a method 1900 for decoding a block of video data using the general aspects described here is shown in FIG. 19. The method commences at Start block 1901 and control proceeds to function block 1910 for decoding syntax from a bitstream indicative of a plurality of sets of filter parameters used for filtering regions of a picture. Control then proceeds from block 1910 to block 1920 for determining regions of the picture from the bitstream using common sets of filter parameters for filtering at least one reconstructed block of the picture. Control proceeds from block 1920 to block 1930 for filtering the at least one reconstructed block with the set of filter parameters associated with the region comprising the at least one reconstructed block. Control then proceeds from block 1930 to block 1940 for decoding the filtered reconstructed block of the picture.

Figure 20:
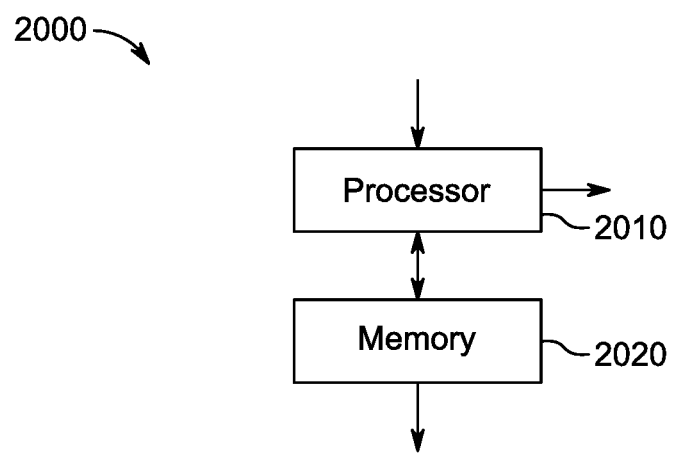
FIG. 20 shows an embodiment of an apparatus for encoding or decoding using in-loop filtering with multiple regions.

FIG. 20 shows one embodiment of an apparatus 2000 for encoding or decoding a block of video data. The apparatus comprises Processor 2010 and can be interconnected to a memory 2020 through at least one port. Both Processor 2010 and memory 2020 can also have one or more additional interconnections to external connections.

Processor 2010 is configured to either encode or decode video data by forming a plurality of reference arrays from reconstructed samples of a block of video data, predicting a target pixel of the block of video data respectively by applying a set of weights, chosen from a plurality of sets of weights, to one or more of the plurality of reference arrays, computing a final prediction for the target pixel of the block of video as a function of predictions respectively from one or more of the reference arrays and, either encoding or decoding the block of video using the final prediction.

The invention claimed is:

1. A method, comprising:
determining regions of a picture in which to use common sets of filter parameters for filtering at least one reconstructed block of a picture;
obtaining a plurality of sets of filter parameters;
filtering a region of said picture comprising the at least one reconstructed block with a common set of filter parameters for blocks within said region; and
encoding information in a bitstream comprising syntax indicative of a set of filter parameters used for filtering said region, further comprising Adaptive Loop Filter parameters encoded in a picture header, a shape of the region is coded as a map, and an encoded version of said region and wherein a filter block is a size having a same set of filter parameters, each filter block belongs to one filter region and a filter region is a sub-part of a slice, and wherein said Adaptive Loop Filter parameters are signaled at a picture level or higher and a filter block selects a filter parameter from the set of filter parameters.

2. An apparatus, comprising:
a processor, configured to:
determine regions of a picture in which to use common sets of filter parameters for filtering at least one reconstructed block of a picture;
obtain a plurality of sets of filter parameters;
filter a region of said picture comprising the at least one reconstructed block with a common set of filter parameters for blocks within said region; and
encode information in a bitstream comprising syntax indicative of a set of filter parameters used for filtering said region, further comprising Adaptive Loop Filter parameters encoded in a picture header, a shape of the region is coded as a map, and an encoded version of said region and wherein a filter block is a size having a same set of filter parameters, each filter block belongs to one filter region and a filter region is a sub-part of a slice, and wherein said Adaptive Loop Filter parameters are signaled at a picture level or higher and a filter block selects a filter parameter from the set of filter parameters.

3. A method, comprising:
decoding syntax from a bitstream indicative of a plurality of sets of filter parameters used for filtering regions of a picture comprising Adaptive Loop Filter parameters in a picture header;
determining regions of said picture from said bitstream using common sets of filter parameters for filtering at least one reconstructed block of said picture, a shape of the regions being decoded as a map;
filtering said at least one reconstructed block with the set of filter parameters associated with the region comprising said at least one reconstructed block; and
decoding said filtered reconstructed block of said picture and wherein a filter block is a size having a same set of filter parameters, each filter block belongs to one filter region and a filter region is a sub-part of a slice, and wherein said Adaptive Loop Filter parameters are signaled at a picture level or higher and a filter block selects a filter parameter from the set of filter parameters.

4. An apparatus, comprising:
a processor, configured to:
decode syntax from a bitstream indicative of a plurality of sets of filter parameters used for filtering regions of a picture comprising Adaptive Loop Filter parameters in a picture header;
determine regions of said picture from said bitstream using common sets of filter parameters for filtering at least one reconstructed block of said picture, a shape of the regions being decoded as a map;
filter said at least one reconstructed block with the set of filter parameters associated with the region comprising said at least one reconstructed block; and
decode said filtered reconstructed block of said picture and wherein a filter block is a size having a same set of filter parameters, each filter block belongs to one filter region and a filter region is a sub-part of a slice, and wherein said Adaptive Loop Filter parameters are signaled at a picture level or higher and a filter block selects a filter parameter from the set of filter parameters.

5. The method of claim 3, wherein said syntax is an index indicative of a set of filter parameters.

6. The method of claim 3, wherein filtering is performed for a Sample Adaptive Offset filter and an index applies for an SAO block.

7. The method of claim 3, wherein filter parameters for an SAO filter are available for filtering other blocks in an SAO region.

8. The method of claim 3, wherein a set of filter parameters for an Adaptive Loop Filter are signaled in a first filter block of a region.

9. The method of claim 3, wherein for Adaptive Loop filter temporal prediction, filter blocks of a current region use filter parameters corresponding to co-located regions in reference pictures.

10. The method of claim 3, wherein, for SAO blocks in a first column or first line of an SAO region, Sample Adaptive Offset filter parameters available for merge comprise filter parameters of a left or an above SAO block outside said SAO region.

11. The method of claim 3, wherein a filter block size changes per region.

12. A device comprising:
an apparatus according to claim 4; and
at least one of (i) an antenna configured to receive a signal, the signal including the video block, (ii) a band limiter configured to limit the received signal to a band of frequencies that includes the video block, and (iii) a display configured to display an output representative of a video block.

13. A non-transitory computer readable medium containing data content generated according to the method of claim 1, for playback using a processor.

14. A non-transitory computer program product comprising instructions which, when the program is executed by a computer, cause the computer to carry out the method of claim 3.

15. The method of claim 3, wherein said syntax is an index indicative of a set of filter parameters.

16. The method of claim 3, wherein filtering is performed for a Sample Adaptive Offset filter and an index applies for an SAO block.

17. The method of claim 3, wherein filter parameters for an SAO filter are available for filtering other blocks in an SAO region.

18. The method of claim 3, wherein a set of filter parameters for an Adaptive Loop Filter are signaled in a first filter block of a region.

19. The method of claim 3, wherein for Adaptive Loop filter temporal prediction, filter blocks of a current region use filter parameters corresponding to co-located regions in reference pictures.

* * * * *